(12) United States Patent  
Demir et al.

(10) Patent No.: US 7,831,456 B2  
(45) Date of Patent: Nov. 9, 2010

(54) ADVERTISEMENT DISPLAY DEPTH OPTIMIZATION TO MAXIMIZE CLICK ACTIVITY PAGE YIELD

(75) Inventors: Ramazan Demir, Sherman Oaks, CA (US); Jiaqi Jin, Harrison, NJ (US); Kerem Tomak, San Francisco, CA (US); Supratim Roy Chaudhury, Santa Clarita, CA (US)

(73) Assignee: Yahoo! Inc., Sunnyvale, CA (US)

( * ) Notice: Subject to any disclaimer, the term of this patent is extended or adjusted under 35 U.S.C. 154(b) by 449 days.

(21) Appl. No.: 11/944,089

(22) Filed: Nov. 21, 2007

(65) Prior Publication Data  
US 2009/0132340 A1   May 21, 2009

(51) Int. Cl.  
*G06F 17/00* (2006.01)

(52) U.S. Cl. .......................................... 705/7
(58) Field of Classification Search .................. 705/7  
See application file for complete search history.

(56) References Cited  
U.S. PATENT DOCUMENTS

2002/0078191 A1   6/2002   Lorenz  
2004/0133671 A1*  7/2004   Taniguchi ............... 709/224  
2005/0144064 A1*  6/2005   Calabria et al. ........... 705/14  
2005/0144068 A1*  6/2005   Calabria et al. ........... 705/14  
2009/0024409 A1*  1/2009   Steelberg et al. ........... 705/1

* cited by examiner

*Primary Examiner*—Thomas Dixon  
(74) *Attorney, Agent, or Firm*—Nathan O. Greene; Brinks Hofer Gilson & Lione (57) ABSTRACT

A method for maximizing page yield in advertisement display to Web users includes tracking click activity associated with advertisements displayed to users through a hierarchal set of search results pages associated with a keyword; tracking bidding activity by advertisers related to the keyword and corresponding advertisements of the advertisements; applying at least one component model to the click or bidding activity as correlated with a particular search results page of the hierarchal set of search results pages via which the advertisements receiving the click activity are displayed, wherein the at least one component model generates a set of output values representative of the tracked click activity; and providing the output values to the at least one component model to iteratively optimize a number of advertisements displayed on the particular search results page via which at least some of the advertisements are displayed in response to a query for the keyword.

25 Claims, 7 Drawing Sheets

ADVERTISEMENT DISPLAY DEPTH OPTIMIZATION TO MAXIMIZE CLICK ACTIVITY PAGE YIELD

BACKGROUND

1. Technical Field

The disclosed embodiments relate to maximizing page yield in the display of advertisements to searching Web users, and more particularly, to determining optimized display depth on search results pages to maximize page yield.

2. Related Art

Online service providers (OSP) are oftentimes also advertisement brokerage providers, which serve advertisements ("ads") to pages of content providers or publishers. The advertisers pay the OSP for click activity on served ads; the OSP in turn pays the content providers for the traffic attracted to create the click activity, keeping a percentage as a fee. The OSP also include search and media businesses services to acquire, identify, and serve ads to Web searchers (variably referred to as users or consumers) who seek information on products or services and who want to transact business online or offline.

Every query or information request is associated with a search or a browsing action to a web page, which may include ads. For a query, such as "dental services," the OSP matches and serves relevant dentists for the searcher. Sets of queries create the notion of "keyword market." Historically, an OSP tends to fill all the available advertisement slots on a Web or search results page with ads, e.g., the OSP attempts to maximize the number of ads given the available inventory of ads without systematically capturing a market response through consideration of the relative responses of the users and the advertisers to the keyword market. More specifically, attempts to maximize page yield have not systematically captured user and advertiser responses in order to optimize a business objective, revenue, or click yield. Page yield refers to the amount of click-related activity obtained from a given set of advertisements displayed on that page.

SUMMARY

By way of introduction, the embodiments described below are drawn to maximizing page yield in the display of advertisements to searching Web users, and more particularly, to determining optimized display depth on search results pages to maximize page yield.

In a first aspect, a method is disclosed for maximizing page yield in the display of advertisements to searching Web users, including: tracking click activity associated with a plurality of advertisements displayed to a plurality of users through a hierarchal set of search results pages associated with a keyword; tracking bidding activity by a plurality of advertisers related to the keyword and corresponding advertisements of the plurality of advertisements; applying at least one component model to the click or bidding activity as correlated with a particular search results page of the hierarchal set of search results pages via which the advertisements receiving the click activity are displayed, wherein the at least one component model generates a set of output values representative of the tracked click activity; and providing the output values to the at least one component model to iteratively optimize a number of advertisements displayed on the particular search results page via which at least some of the advertisements are displayed in response to a query for the keyword.

In a second aspect, a method is disclosed for maximizing page yield by optimizing display depth of advertisements displayed to searching Web users, including: (a) tracking click activity on a plurality of advertisements by a plurality of users via a set of hierarchal search results pages returned in response to a search query for a keyword; (b) tracking bidding activity by a plurality of advertisers related to the keyword and corresponding advertisements of the plurality of advertisements; and (c) calculating an optimum number of advertisements ($d^*$) to display on a particular search results page of the set of hierarchal search results pages in response to the search query such that maximizes the expected page yield according to at least one business objective, wherein the expected page yield of the particular search results page is calculated by summing, at each of a plurality of display depths within $d^*$, a probability of a click at the display depth times a bid price estimate at the display depth, wherein the probability of click and the bid price estimate are obtained from sampled related curves formed from the tracked click and bidding activities based on at least one query; (d) executing a Monte Carlo randomization procedure to include: (i) randomly sampling probability and bid/price curves related at least one different query; (ii) recalculating $d^*$ as per step (c); and (iii) repeating steps (i) and (ii) to calculate potential multiple optimum numbers ($d^*$) of advertisements; and (e) serving to the particular search results page at least some of the plurality of advertisements according to at least one calculated value of $d^*$ in response to the search query for the keyword.

In a third aspect, a method is disclosed for maximizing page yield by optimizing display depth of advertisements displayed to searching Web users, including: (a) tracking click activity on a plurality of sponsored advertisements by a plurality of users via a set of hierarchal search results pages returned in response to a search query for a keyword; (b) tracking bidding activity by a plurality of advertisers related to the keyword and corresponding advertisements of the plurality of advertisements; (c) calculating an optimum number of advertisements ($k^*$) to display on a particular search results page of the set of hierarchal search results pages in response to the search query such that a probability that a total share of click volume being greater than that of any of the plurality of advertisers is less than or equal to a predetermined business tuning parameter ($\beta$), wherein the probability values are obtained from a probability of click distribution based on the tracked click activity from at least one query; (d) executing a Monte Carlo randomization procedure to include: (i) randomly sampling a different probability of click distribution than that of step (c) based on at least one different query; (ii) recalculating $k^*$ as per step (c); and (iii) repeating steps (i) and (ii) to calculate potential multiple optimum numbers ($k^*$) of advertisements; and (e) serving to the particular search results page at least some of the plurality of advertisements according to at least one calculated value of $k^*$ in response to the search query for the keyword.

In a fourth aspect, a method is disclosed for maximizing page yield by optimizing display depth of advertisements displayed to searching Web users, the method comprising: (a) tracking click activity on a plurality of sponsored advertisements by a plurality of users via a set of hierarchal search results pages returned in response to a search query for a keyword; (b) tracking bidding activity by a plurality of advertisers related to the keyword and corresponding advertisements of the plurality of advertisements; (c) calculating an optimum number of advertisements ($k^*$) to display on a particular search results page of the set of hierarchal search results pages in response to the search query such that a probability that a total share of click volume being greater than that of any of the plurality of advertisers is less than or equal to a predetermined business tuning parameter (β), wherein k* represents a display depth on the particular search results page; (d) computing class cardinality of the plurality of advertisers based on price bid elasticity of each advertiser for the keyword, wherein the class cardinality includes classes comprising at least market maker, market follower, and market neutral; (e) decrementing k* by 1 if the class of the advertiser at the display depth corresponding to k* is market neutral; (f) repeating step (e) until the advertiser at the given depth is determined to be a market maker or a market follower; and (g) serving to the particular search results page at least some of the plurality of advertisements according to at least one calculated value of k* in response to the search query for the keyword.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
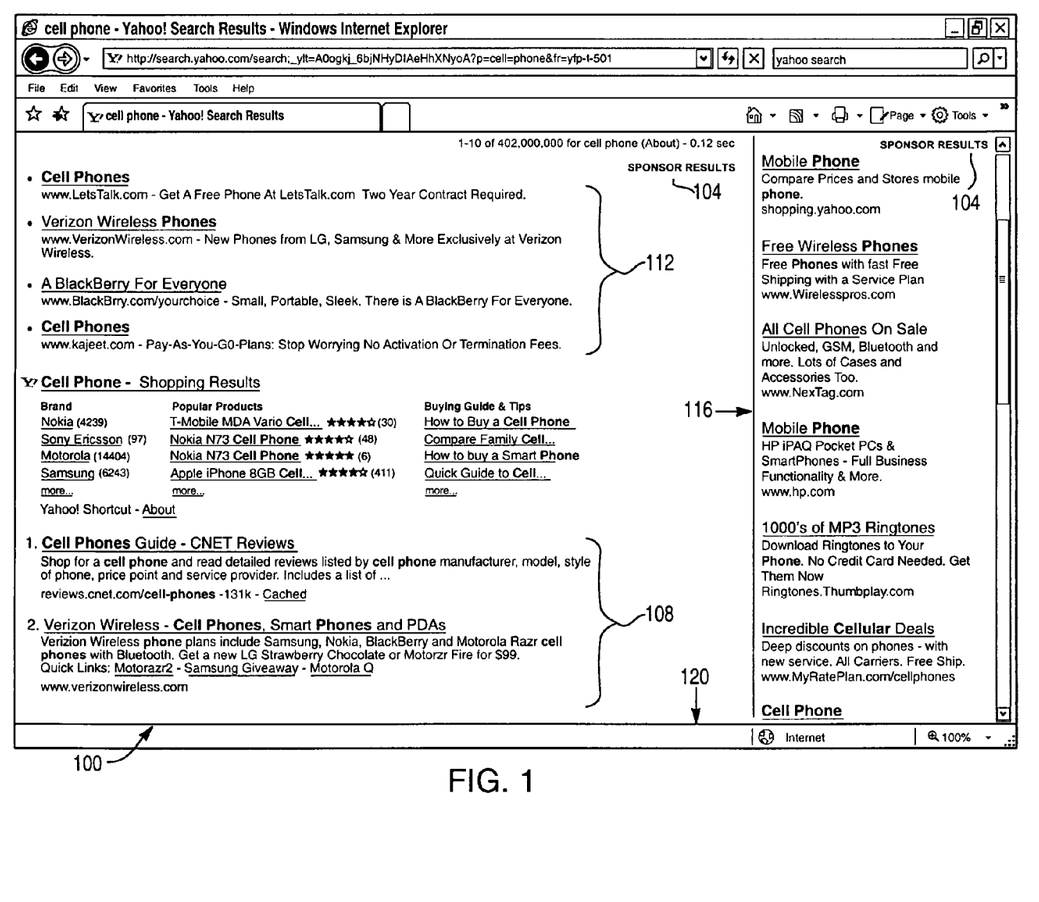
FIG. 1 illustrates an exemplary search results page including sponsored advertisements served with organic search results.

FIG. 1 illustrates an exemplary search results page 100 including sponsor results 104 (variably referred to as sponsored advertisement ("ads") 104) served with organic search results 108. Sponsored ads 104 are sites that pay for placement in search results on keywords that are relevant to their business. Sponsored ads 104 are listings that appear on search results pages 100 and other sections of an online service provider ("OSP"). Sponsored ads 104 should be relevant to the specific search term(s) used when queried by a user, and are listed separately so they can be distinguished from organic search results 108. As displayed, a search for the keyword "cell phone" returned 402,000,000 results, 10 of which are displayed as organic search results 108 on the search results page 100.

The sponsored ads 104 are broken into three sections representing three cardinal directions: a north 112, an east 116, and a south 120. The sponsored ads 104 located at the south section 120 of the results page 100 are not viewable in FIG. 1 but are located beneath the tenth ad of the organic search results 108. Each sponsored ad 104 takes a position on the page 100 referred to as an advertisement (or ad) slot. There are a limited number of slots per each search results page 100 across all the sponsored ads 104 in the three cardinal directions, usually totaling about 14 to 15 ads. The number of organic search results 108 are also limited by how many can be practically delivered to and focused on in a page view by a typical computer screen. While the following description is generally drawn to the sponsored ads 104, it is also applicable to the organic search results 108 or any other ads delivered to a results page 100 as part of a hierarchal set of results pages in response to a search or browsing action that has the affect of executing a keyword query over the internet or Web. Accordingly, where the term "search result page" is referred to herein, it should be understood to refer to any results page from user searching or browsing actions.

Figure 2:
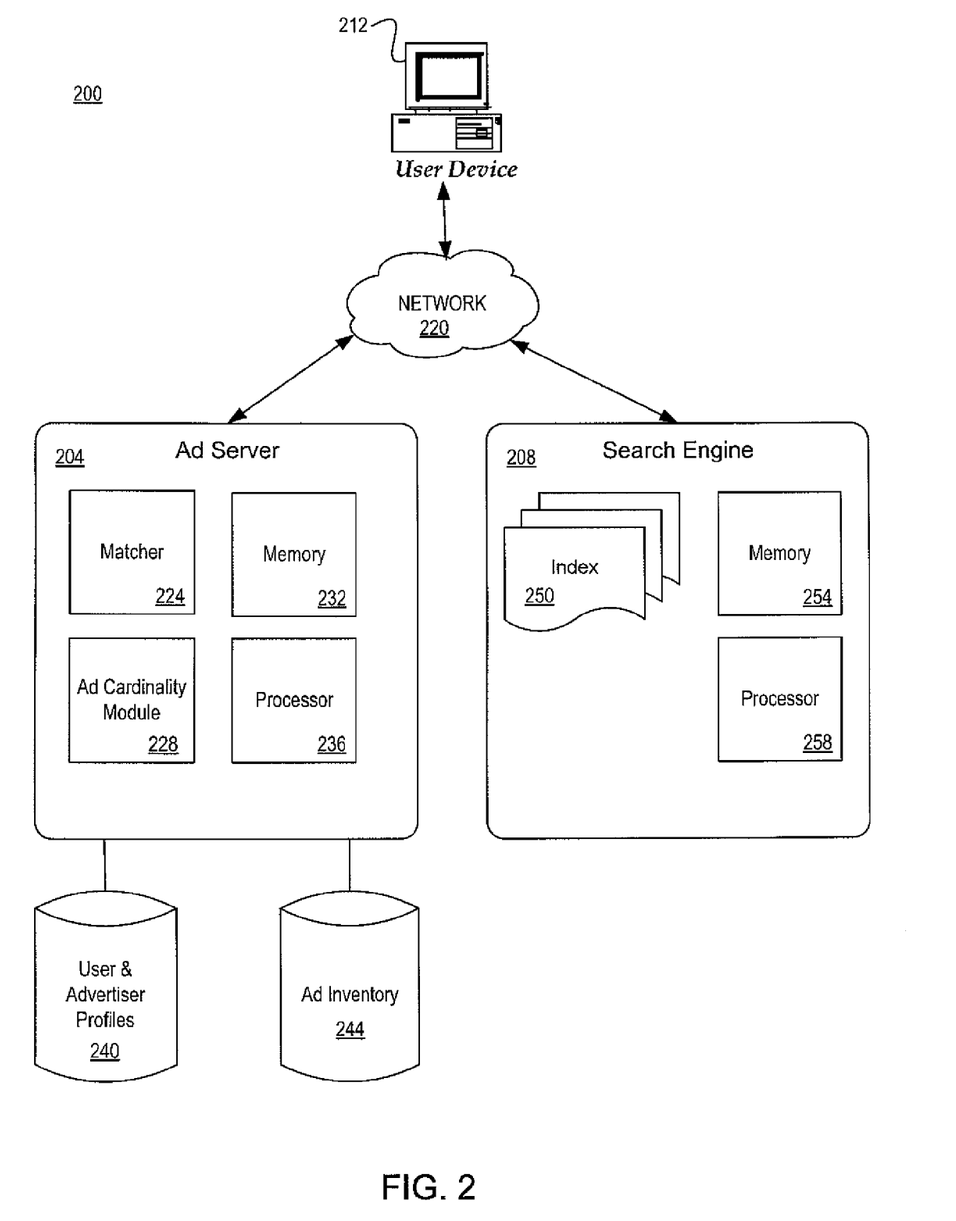
FIG. 2 illustrates a system diagram of a system designed to maximize page yield to meet business objectives through optimization of display depth by capturing and considering response of searchers and advertisers.

FIG. 2 illustrates a diagram of a system 200 designed to maximize page yield to meet business objectives through optimization of display depth by capturing and considering responses of searchers and advertisers. Page yield refers to the amount of click-related activity obtained from a given set of advertisements ("ads") displayed on a search results 100 or other web page. Also, the term "ad cardinality" represents a total number of ads to be served on a search results or other web page or page section. The term "display depth" is another way to articulate a number of ads displayed on a page 100, e.g., the depth to which the ad slots are filled on the page 100. Decreasing depth means that an ad is located further down a page 100. Also, the term "rank" as used herein relates to a level of the ad as ranked within the hierarchal set of search results pages. Decreasing rank means that an ad is located on a page 100 deeper within the hierarchal set of search results pages and also perhaps that it located lower on that page 100. For instance, the ranks of the sponsored ads 104 actually shown on the page 100 in FIG. 1 are 1 through 11. The ranks of the sponsored ads 104 displayed on page 5, however, may be ranked 65 through 78 for instance.

Quantifying the number of ads, which necessarily depends on the searching user, queries, and market attributes, is an aspect of the "ad serving" function that has heretofore been overlooked. The system 200 performs this quantification by calculating an optimal number of ads, e.g., the ad cardinality for individual keyword markets to best manage user and advertiser response to optimize business objectives.

The system includes an ad server 204, a search engine 208, and a user device 212 used for searching and browsing, all that communicate over a network 220. The network 220 may include the internet or World Wide Web ("Web"), a wide area network (WAN), a local area network ("LAN"), and/or an extranet. The ad server 204 includes a matcher 224 having matching technologies to match served ads 104 and search results 108 based on relevancy to one or more keywords, an ad cardinality module 228 to optimize a number of ads displayed on a results page, a memory 232, a processor 236, a user and advertiser profiles database 240, and an ad inventory database 244.

The search engine 208 includes an index 250, a memory 254, and a processor 258. The index 250, together with the processor 258 and memory 254, categorize web pages of varying content, and return a hierarchal set of web pages in response to a query for certain keywords. The indexed web pages are saved in the index 250 in relation to those keywords. As discussed previously, an OSP owns the search engine 208 and usually also the ad server 204. The ad server 204 is configured to communicate with the search engine 208 so that the ad server 204 also receives the hierarchal set of search results pages, and with its matcher 224, its processor 236, and its memory 232, serves a number of ads from the ad inventory database 244 that best match a queried-for-keyword to one or more search results pages 100. Content of the organic search results 108 from a keyword query may also be used by the matcher 224 to serve the best matched ads.

Before service of the matched ads to the search results pages 100, however, the ad cardinality module 228 is responsible for analyzing historically tracked market user and advertiser responses, and with use of at least one component model, may limit the number of ads served to each of the search results pages 100 of the set of hierarchal search results pages. The ad cardinality module 228 "may" limit the number of ads because the default historically has been to serve the maximum number of ads to all of the available advertisement slots on each page. It may be that, in some cases, the maximum number of ads is still the optimal number, but in many if not most cases it will not be the optimal number of ads to be served to any given search results page after the at least one component model is executed. The user response used by the component models may refer to any type of user-related click activity with reference to the served ads. Also, the advertiser response includes at least a historical willingness to pay for a click by the user, e.g., a level of bid activity associated with the advertiser in relation to the keywords that resulted in the served ads. The tracked user click and advertiser bid activities are stored in the user and advertiser profile database 240.

Figure 3:
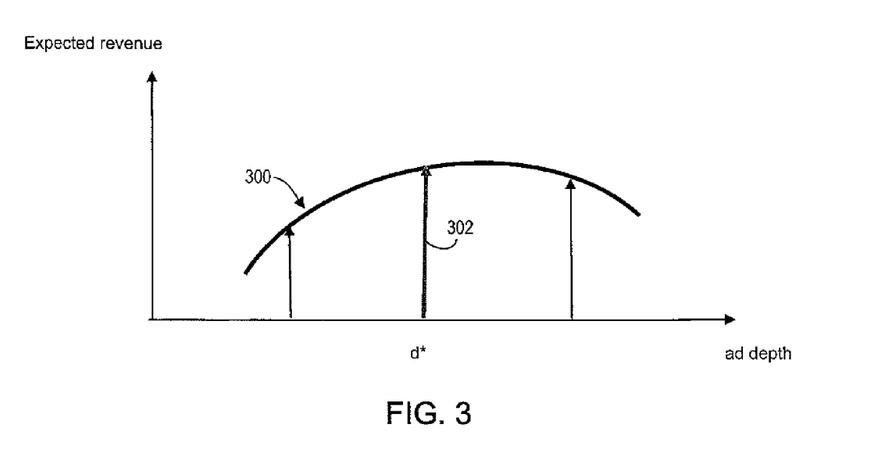
FIG. 3 illustrates an advertisement ("ad") depth curve depicting an optimal depth for maximum expected revenue.

FIG. 3 illustrates an advertisement depth curve 300 depicting an optimal depth for maximum expected revenue. The depth curve 200 illustrates a hypothetical example in which expected revenue is the business objective, and optimal ad cardinality is not necessarily the maximum available number of ads. Note that the middle arrow 302 from the ad depth (or x axis) originates at $d^*$ and corresponds to a maximum revenue. As used herein, $d^*$ or $k^*$ will refer to an optimal number of ads to be displayed on a search results page 100.

Figure 4:
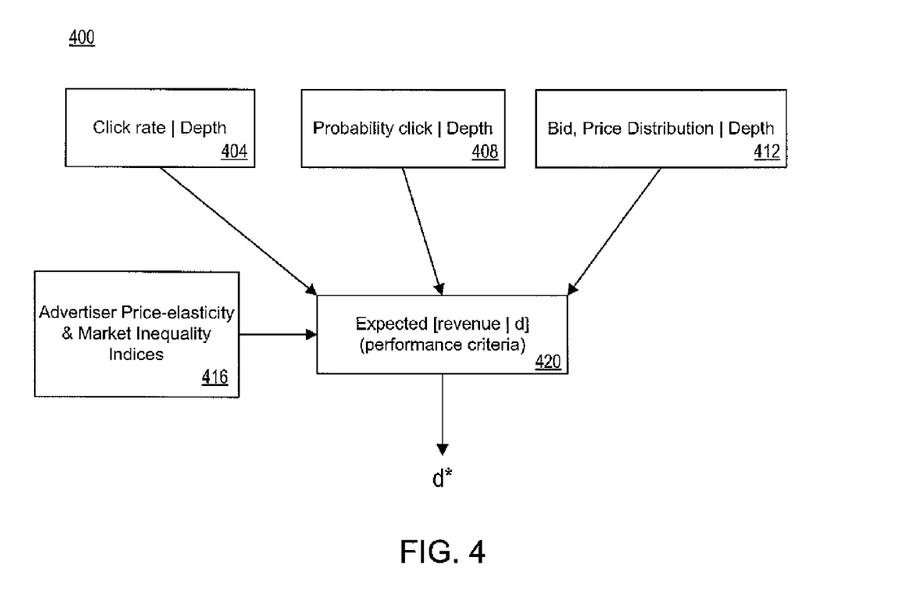
FIG. 4 illustrates component models in block diagram form for optimizing display depth as tracked according to expected revenue.

FIG. 4 illustrates a block diagram 400 of component models for optimizing display depth as tracked according to expected revenue. The component models include the various metrics as alluded to, which will be discussed in detail below. The component models include, but are not limited to: a click rate according to depth (404); a probability of click according to depth (408); a bid/price distribution of the advertisers according to depth (412); and advertiser price-elasticity and market inequality indices (416), each of which will be discussed in more detail below. Note the term "elasticity" refers to the responsiveness of a dependent economic variable, e.g., a bid price, to changes in influencing factors, such as the demand by other advertisers to bid on the same keyword or the responsiveness of users to ads served in response to the keyword. The result of each component model is expected revenue according to depth (420), or some other performance criteria 420 may be used. The ultimate output of one or more component models is the optimal number or cardinality of ads ($d^*$) to be displayed on a given search results page. Note that the output of any component model may be continuously reinserted into the component model so that $d^*$ may be iteratively updated through user and advertiser market changes.

Figure 5:
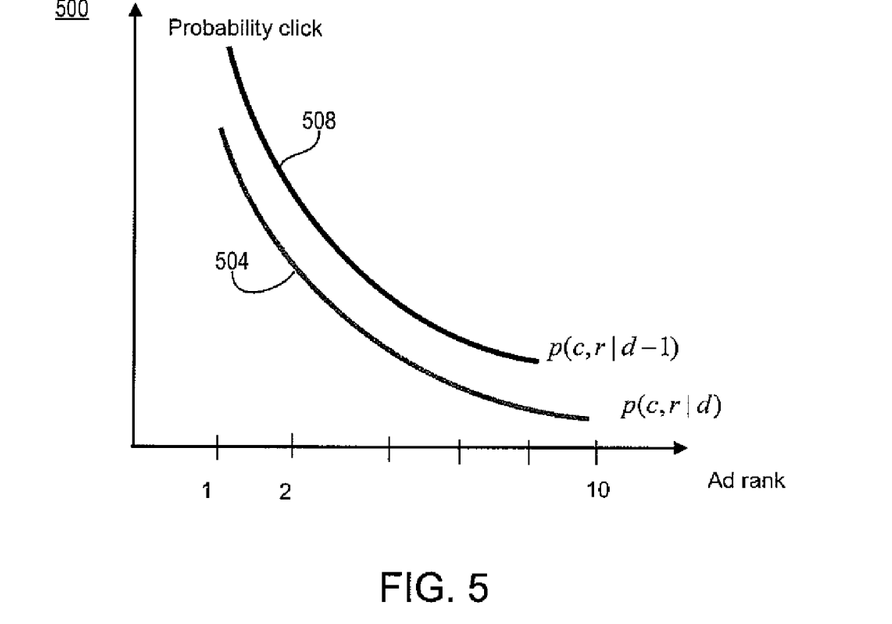
FIG. 5 is a graph depicting user click response shifts in click rank distribution curves according to decreasing depth.

The click rate according to depth (404) and the probability of click according to depth (408) are related models that include click distributions or click-rank depth elasticity determinations. These models 404, 408 estimate the probability of click distribution or models by rank for differing display depths based on historic click distributions. Another way to think of the models 404, 408 is as a click rank-depth elasticity that measures how click rank distribution responds to depth changes. FIGS. 4 and 5 each illustrate different forms of the user click response shift for decreasing depth changes.

Figure 6:
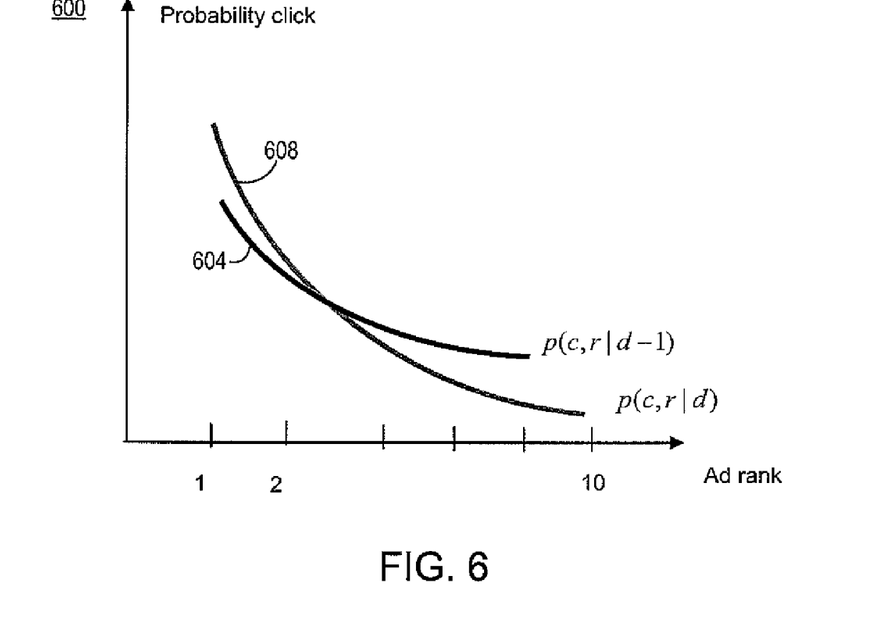
FIG. 6 is a graph depicting user click response shifts in click rank distribution curves that cross as depth decreases.

FIG. 5 is a graph 500 depicting user click response shifts in click rank distribution curves according to decreasing depth. FIG. 6 is a graph 600 depicting user click response shifts in click rank distribution curves that cross as depth decreases. Note that in FIG. 5 a first curve 504 has a lower probability of click compared to a second curve 508 that represents a decrease in depth of d−1. This increase in probability of a click increases across the span of decreasing ad rank. In FIG. 6, in contrast, a first curve 604 and a second curve 608 begin as in FIG. 5 with an increase in the probability of clicks, but at a rank of about three, the curves cross and the second curve 604 begins to have a lower probability of click despite being displayed at an increased depth. FIG. 6 also makes clear that a probability of click will not always track with different ranked pages, but may vary as the page ranking also decreases.

The probability click curves of FIGS. 5 and 6 can be estimated and modeled at individual user level. For a given keyword market, a click rank-depth elasticity, or $C_{r,d}$ is defined by $$\frac{\partial C_r}{C_r} \frac{d}{\partial d},$$

which measures how click rank distribution changes according to any change in depth. Click rank-depth elasticity distribution estimates are aggregated for all tracked users. Extensions to the user level in estimation and modeling tend to be granular and reflect intrinsic user differences, such as whether or not a user likes to receive ads, whether or not a user likes to explore, their intent of query, etc. Identifying such core differences in users improves capacity to improve their click propensity, and therefore also increase revenue.

Accordingly, the system 200 may build a user index with use of the data stored in the user profiles database 240 to map and track user differences. The user index may then be useable in ranking users, pricing bids, and determining optimal numbers of ads (d*). In the presence of ad serve time constraints, user index values can be sampled from a pre-computed distribution function for a given keyword market based on a mix of features, which are discussed below. An index probability function may also be estimated on a user by sampling the stored index values in response to a query by the user on a keyword. Advertisements may then be served at a calculated rank-depth based on the estimated index probability function.

Figure 7:
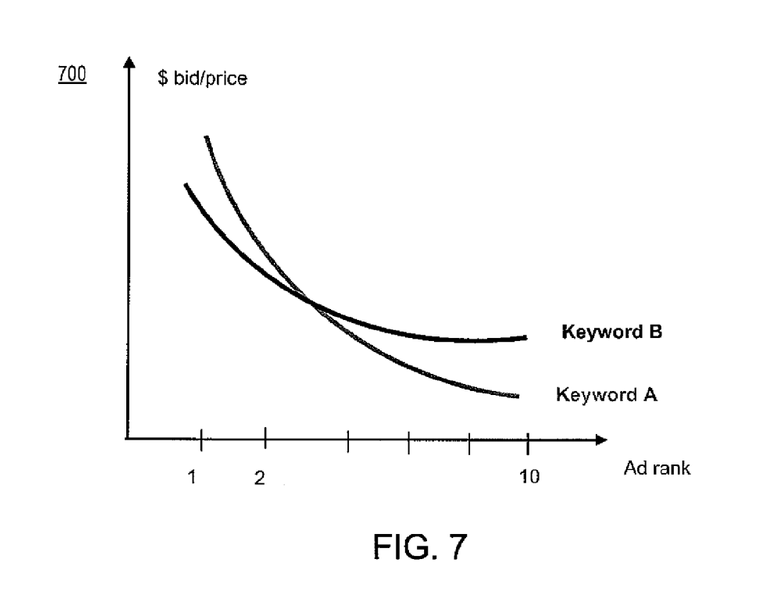
FIG. 7 is a graph depicting a set of bid/price curves for two keywords generated from historic advertising bidding data, showing value generated according to decreasing rank depth.

FIG. 7 is a graph 600 depicting a set of bid/price curves for two keywords (A and B) generated from historic advertising bidding data, showing value generated according to decreasing depth. The bid/price distribution of the advertisers according to depth (412) is a model for market bid/price curves that uses historic advertiser bidding data stored in the advertiser profile database 140. FIG. 7 illustrates that each keyword (A and B) may have different price curves that reflect the value an OSP generates from a particular rank based on historical bidding on respective Keywords A and B. For instance, Keyword A decays faster than Keyword B with decreasing rank, which indicates that Keyword A generates lower value for lower ranks compared to Keyword B for a given click.

The advertiser price-elasticity and market inequality indices (416) are models for advertiser price-elasticity curves at a query level that profiles advertisers according bid-related cardinality. In changing ad cardinality, the system 200 is able to change the available advertisement slots on a search results page 100 and thereby also impact click distribution among ranks and slots, e.g., at different display depths within varying ranked results across a plurality of search results pages. This may necessarily impact advertiser click share and consequently impact advertiser behavior depending on their marketing objectives, their willingness to pay for clicks, their keyword mix, their target geographies, and their total spend amounts. So, any action affecting ad cardinality requires a segmentation of advertiser response.

For instance, one can predict active advertisers behave differently than inactive advertisers. Advertisers who strive for market share may differ from advertisers who follow market makers. The system 200 may then segment or classify advertisers within a plurality of classes, including at least as a market maker, a market neutral, and a market follower (or market reactor). Membership in a class is measured by bid-click volume elasticity curves (or price/demand curves) that measure an advertiser's willingness to pay to any click share or volume change. Market makers may blend direct response or brand awareness objectives. Market followers tend to be direct response players or aggregators/arbitrageurs. Market neutrals tend to be inactive in bidding; tend to get low click share and in general do not exceed the minimum efficiency scale in click volume. Quantification of the advertiser response, which is referred to as "second order impact," is relevant for market sustainability.

The advertiser classes are further based on a mix of features such as average bid, average quality score, average spend, and average display rank. Generally, the system 200 can use an arbitrary number of classes, yet existing models work well with three classes (or clusters) mentioned above. In a first pass in utilizing advertiser-level data in the database 240, the ad server 204 constructs clusters and maps advertisers to member classes. In a second pass, the ad server 204 calculates percentages of each class member within the available advertiser classes for each period of time corresponding to discrete time epochs.

Page yield and depth optimization is an implicit capacity control problem which controls pricing in a market by incorporating user and advertiser response. Pricing in an OSP keyword auction can be such that a k-th ad is priced through a k+1th ad given that k+1 is not a winning advertiser. The system 200 may use ranking and pricing in bid auctions to incorporate user index data through a ranking mechanism such as f(bid, user index)×g(quality score, user index factor). The quality score of function g is related to a relevancy of an ad for a given keyword.

Figure 8:
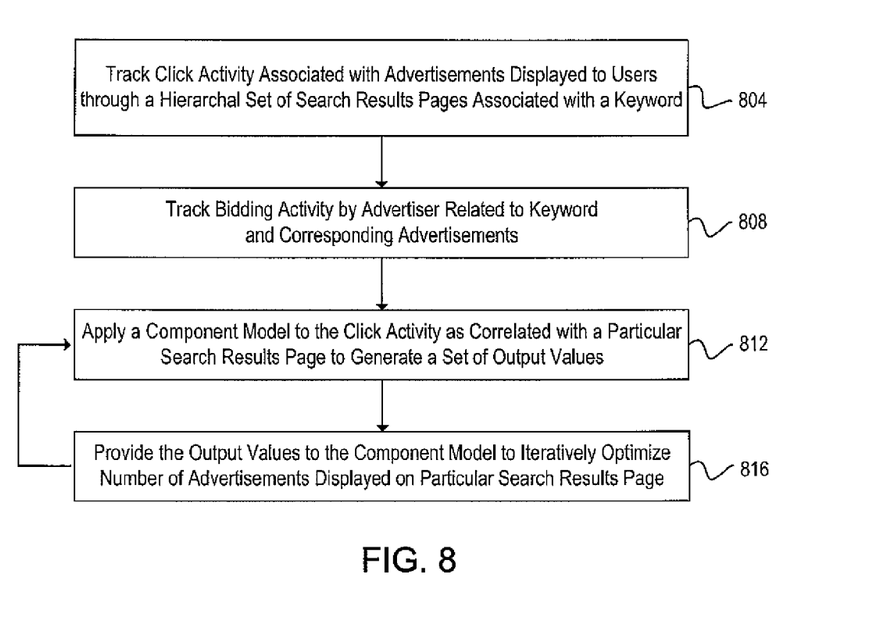
FIG. 8 is a flow chart of a method for maximizing page yield in the display of ads to searching Web users by optimizing a number of ads displayed on a particular search results page.

FIG. 8 is a flow chart of a method for maximizing page yield in the display of ads to searching Web users by optimizing a number of ads displayed on a particular search results page. At block 804, the ad cardinality module 228 tracks click activity associated with a plurality of advertisements displayed to a plurality of users through a hierarchal set of search results pages associated with a keyword. At block 808, the ad cardinality module 228 tracks bidding activity by a plurality of advertisers related to the keyword and corresponding advertisements. The activity tracked at blocks 804 and 808 may be an on-going procedure and may be conducted in parallel.

At block 812, the ad cardinality module 228 applies at least one component model to the click or bidding activity as correlated with a particular search results page of the hierarchal set of search results pages via which the advertisements receiving the click activity are displayed, wherein the at least one component model generates a set of output values representative of the tracked click activity. At block 816, the ad cardinality module 228 provides the output values to the at least one component model to iteratively optimize a number of advertisements displayed on the particular search results page via which at least some of the advertisements are displayed in response to a query for the keyword.

To summarize and expand on two approaches that incorporate the above component models, the following optimal ad cardinality (or display depth) methods may be implemented by the ad cardinality module 228.

Figure 9:
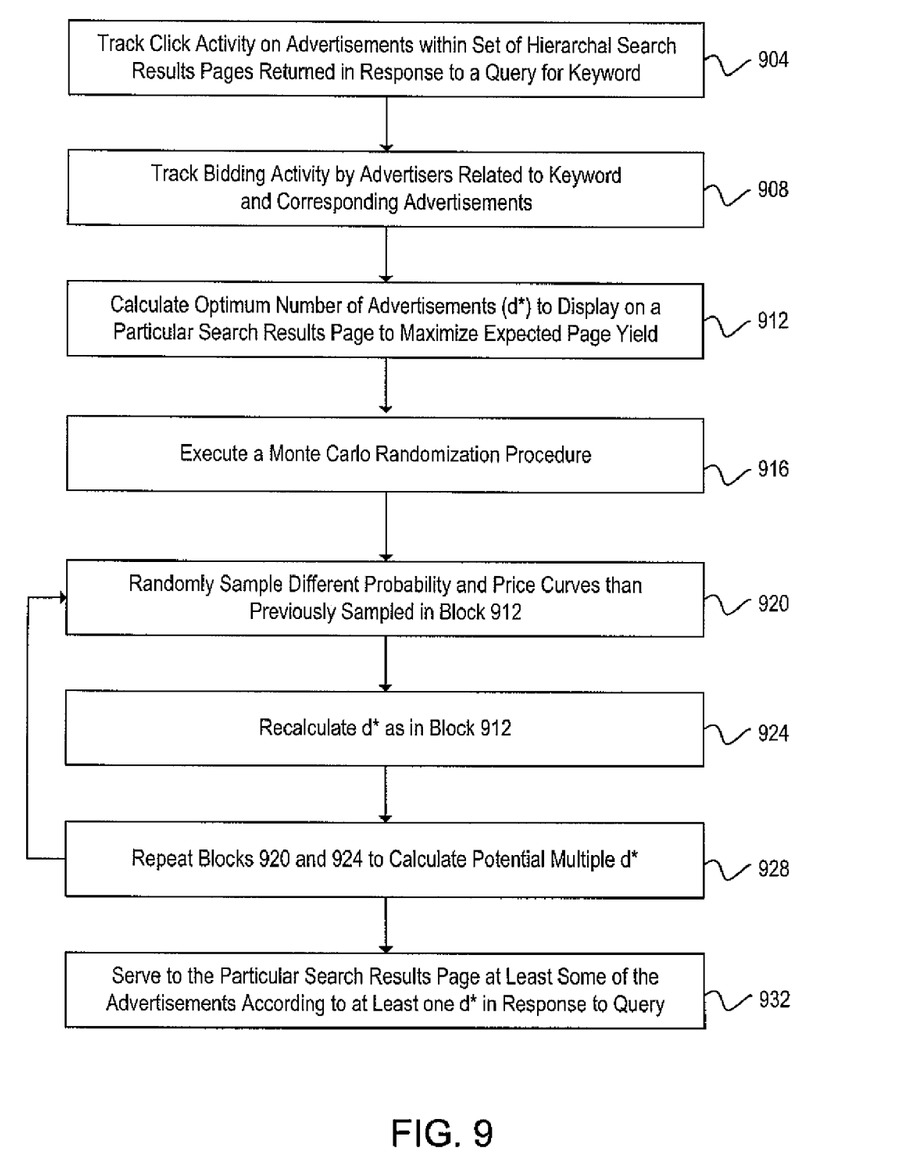
FIG. 9 is a flow chart of a method for maximizing page yield by optimizing display depth of ads displayed on a search results page to searching Web users in response to keyword queries.

Option 1: The Decomposition Approach: FIG. 9 illustrates method for maximizing page yield by optimizing display depth of ads displayed on a search results page to searching Web users in response to keyword queries. At block 904, the ad cardinality module 228 tracks click activity on a plurality of advertisements by a plurality of users via a set of hierarchical search results pages returned in response to a search query for a keyword. At block 908, the ad cardinality module 228 tracks bidding activity by a plurality of advertisers related to the keyword and corresponding advertisements of the plurality of advertisements.

At block 912, the ad cardinality module 228 calculates an optimum number of advertisements (d*) to display on a particular search results page of the set of hierarchal search results pages in response to the search query such that maximizes the expected page yield according to at least one business objective. The expected page yield of the particular search results page is calculated by summing, at each of a plurality of display depths within d*, a probability of a click at the display depth times a bid price estimate at the display depth, wherein the probability of click and the bid price estimate are obtained from sampled related curves as discussed above with reference to FIGS. 4 through 7. In general, any given query results in served advertisements, which results in click-related data including cost per click (CPC) information by rank for the query, so any historical query may lead to a probability of click and bid price estimate curves.

At block 916, the ad cardinality module 228 executes a Monte Carlo randomization procedure that includes at least the steps of blocks 920, 924, and 930. At step 920, the ad cardinality module 228 randomly samples different probability and bid/price curves than those sampled in block 912, e.g., one related to at least one different historical query. At block 924, the ad cardinality module 228 recalculates d* as per block 912. At block 928, the ad cardinality module 228 repeats steps 920 and 924 to calculate potential multiple optimum numbers (d*) of advertisements. Finally, at block 932, the ad server 204 serves to the particular search results page at least some of the plurality of advertisements according to at least one calculated value of d* in response to the search query for the keyword.

The business objective referenced above may include maximizing revenue or user clicks, or some other goal. Also, the multiple values of d* from the above method may be calculated for each search results page of the set of hierarchal search results pages. Furthermore, when values of d* for each search results page is calculated, a histogram may be created for the multiple values of d* for the keyword, including a frequency of rank-depth corresponding to each d*. For instance, the histogram may include a percentage of rank-depth corresponding to various values of d*, e.g., 30% at an optimal depth of 4 and 70% at an optimal depth of 7.

Another extension of the method in FIG. 9 is to compute advertiser class cardinality, e.g., among at least three of the market makers, market neutrals, and market followers. If the computed optimal depth (d*) corresponds to a class K advertiser (e.g., a market neutral advertiser) than the depth (d*) is decremented by one (1) until d* reaches a class K−1 of advertiser (e.g., a market maker or a market follower). A greater granularity of advertiser class may, of course, be implemented to include more than three types of advertisers.

Figure 10:
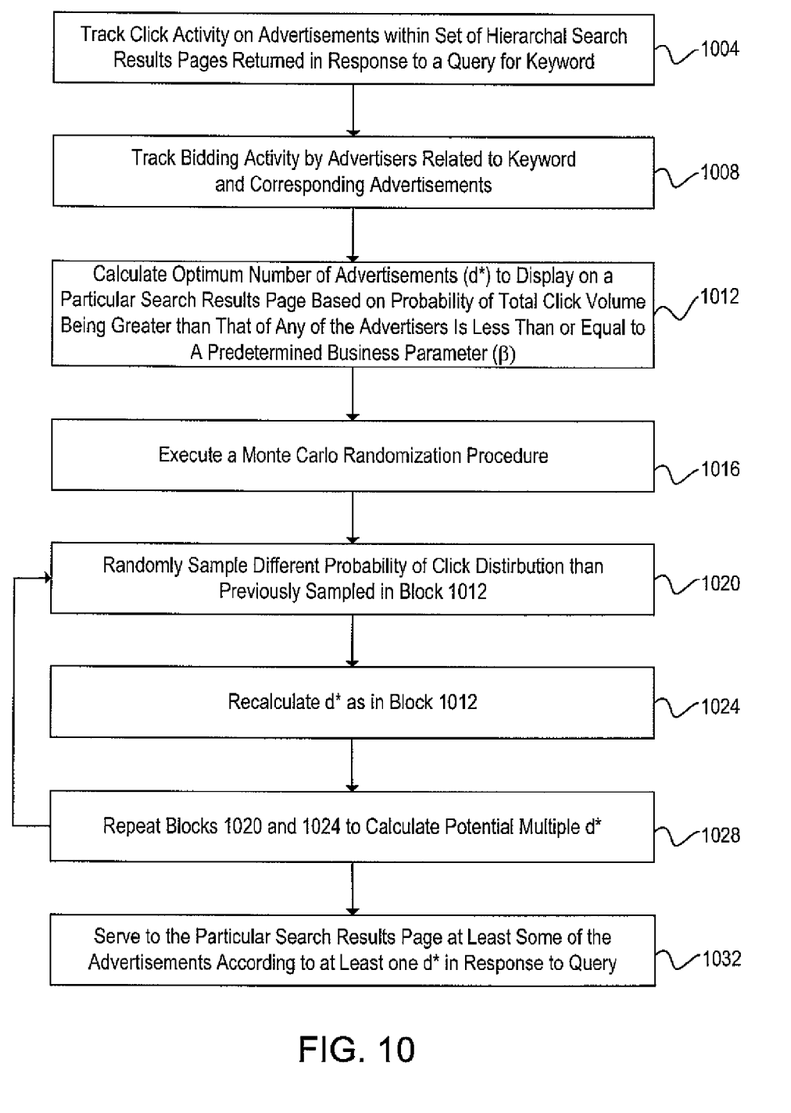
FIG. 10 is a flow chart of an alternate method to that of FIG. 9.

Option 2: Beta(β)-Perturbation Approach:

FIG. 10 is a flow chart of an alternate method to that disclosed with reference to FIG. 9. At block 1004, the ad cardinality module 228 tracks click activity on a plurality of advertisements by a plurality of users via a set of hierarchal search results pages returned in response to a search query for a keyword. At block 1008, the ad cardinality module 228 tracks bidding activity by a plurality of advertisers related to the keyword and corresponding advertisements of the plurality of advertisements.

At block 1012, the ad cardinality module 228 calculates an optimum number of advertisements (k*) to display on a particular search results page of the set of hierarchal search results pages in response to the search query such that a probability that a total share of click volume being greater than that of any of the plurality of advertisers is less than or equal to a predetermined business tuning parameter (β). The probability values are obtained from a probability of click distribution based on the tracked click activity from at least one query. The business tuning parameter (β) reflects a percentage of clicks to be allocated to higher ranks of the hierarchal set of search results pages. For instance, slots of advertisements are cut back (shallower display depth) where each slot gets a percentage of clicks such that a probability that a total share of click volume on the page being greater than that of any of the plurality of advertisers thereon is less than or equal to β.

At block 1016, the ad cardinality module 228 executes a Monte Carlo randomization procedure to include the steps at blocks 1020, 1024, and 1028. At block 1020, a different probability of click distribution is sampled from that sampled at block 1012. At block 1024, the optimal number of advertisements (k*) is recalculated as per the step in block 1020. At block 1028, the steps in blocks 1020 and 1024 are repeated to calculate potential multiple optimum numbers (k*) of advertisements. At block 1032, the ad server 204 serves to the particular search results page at least some of the plurality of advertisements according to at least one calculated value of k* in response to the search query for the keyword.

The method of FIG. 10 may continue where each value of k* represents a display depth on the particular search results page, wherein calculating k* in block 1020 includes: (1) computing class cardinality of the plurality of advertisers based on price bid elasticity of each advertiser for the keyword, wherein the class cardinality includes classes including at least market maker, market follower, and market neutral; (2) decrementing k* by 1 if the class of the advertiser at the given depth is market neutral; and (3) repeating the step in (2) until the advertiser at the given depth is determined to be a market maker or a market follower. As in FIG. 9, the method in FIG. 10 may also be extended to include creation of a histogram, including a frequency of a rank-depth corresponding to each k*.

The main output of the methods of FIGS. 8, 9, and 10 include a look-up table as shown in Table 1 below, which indicates keyword, optimal display depth for a results page at a specific date and time. For each query epoch or time period, the ad server 204 may sample from the optimal depth distribution function of the Table when serving ads. The optimal display depth (d*, k*) may be the same or different for each search results page of a hierarchal set of search results pages returned in response to query. Accordingly, the middle column of Table 1 may further be arranged according to page or section of a page within the hierarchal set of search results pages.

TABLE 1

| Keyword(s) | Optimal Display Depth (d*, k*) | Date, time |
|---|---|---|
| "car insurance" | 7 | Aug. 1, 2007 |
| "car purchase" | 3 | Aug. 1, 2007 |
| "car pricings" | 5 | Aug. 2, 2007 |

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for maximizing page yield in the display of advertisements to searching Web users, the method executed by a server having a processor and memory, the method comprising:
    tracking click activity, by the server, associated with a plurality of advertisements displayed to a plurality of users through a hierarchal set of search results pages associated with a keyword that are delivered by a search engine;
    tracking bidding activity, by the server, of a plurality of advertisers related to the keyword and corresponding advertisements of the plurality of advertisements;
    applying, by the server, at least one component model to the click or bidding activity as correlated with a particular search results page of the hierarchal set of search results pages via which the advertisements receiving the click activity are displayed, wherein the at least one component model generates a set of output values representative of the tracked click activity; and
    providing, by the server, the output values to the at least one component model to iteratively optimize a number of advertisements displayed on the particular search results page via which at least some of the advertisements are displayed in response to a query for the keyword.

2. The method of claim 1, wherein the plurality of advertisements comprise sponsored advertisements.

3. The method of claim 1, wherein the number of advertisements displayed on the particular search results page represents a display depth, wherein display depths for each search results page of the set of search results pages may be optimized through the at least one component model.

4. The method of claim 3, wherein a level of an advertisement within the hierarchal set of search results pages comprises a rank, and wherein the at least one component model comprises a depth elasticity of click rank distribution that defines the probability of a click at a given rank-depth through the hierarchal set of search results pages.

5. The method of claim 4, wherein a click rank-depth is defined by $C_{r,d}$ and its elasticity is given by $$\frac{\partial C_r}{C_r} \frac{d}{\partial d}$$

for the keyword, wherein C is the probability of click, r is rank, and d is depth.

6. The method of claim 4, wherein applying the depth elasticity of the click rank distribution model comprises indexing the plurality of users to differentiate clicking activity between the plurality of users at different rank-depths of the hierarchal set of search results pages.

7. The method of claim 6, further comprising:
    indexing the plurality of users according to at least one of the following dimensions: intent of query; those that like advertisements versus those that do not; or those that tend to explore advertisements versus those that do not.

8. The method of claim 7, further comprising:
    storing the indexed values associated with the plurality of users;
    estimating an index probability function on a user by sampling from the stored index values in response to a query on the keyword; and
    serving advertisements at a calculated rank-depth based on the estimated index probability function.

9. The method of claim 3, wherein the at least one component model comprises an advertiser class model, the method further comprising:
    segmenting a plurality of advertisers that own the plurality of respective advertisements into at least one of a plurality of advertiser classes that depend at least on bid price elasticity.

10. The method of claim 9, wherein the plurality of advertiser classes comprise at least one of market maker, market follower, and market neutral.

11. The method of claim 9, further comprising:
    measuring membership in an advertiser class by bid-click volume elasticity curves that measure willingness of advertisers to pay up to a click share or a volume change.

12. The method of claim 11, wherein measuring membership in an advertiser class is based on a mixture of features selected from the group consisting of an average bid, an average quality score, an average spend amount, and an average display rank.

13. The method of claim 3, wherein the output comprises a look-up table including the keyword and display depth for a specific date and time.

14. A method for maximizing page yield by optimizing display depth of advertisements displayed to searching Web users, the method executed by a server having a processor and memory, the method comprising:
    (a) tracking click activity, by the server, on a plurality of advertisements by a plurality of users via a set of hierarchal search results pages delivered in response to a search query for a keyword by a search engine;
    (b) tracking bidding activity, by the server, of a plurality of advertisers related to the keyword and corresponding advertisements of the plurality of advertisements; and
    (c) calculating, by the processor, an optimum number of advertisements (d*) to display on a particular search results page of the set of hierarchal search results pages in response to the search query such that maximizes the expected page yield according to at least one business objective, wherein the expected page yield of the particular search results page is calculated by summing, at each of a plurality of display depths within d*, a probability of a click at the display depth times a bid price estimate at the display depth, wherein the probability of click and the bid price estimate are obtained from sampled related curves formed from the tracked click and bidding activities based on at least one query;

(d) executing, by the processor, a Monte Carlo randomization procedure to include:
   (i) randomly sampling probability and bid/price curves related at least one different query;
   (ii) recalculating d* as per step (c); and
   (iii) repeating steps (i) and (ii) to calculate potential multiple optimum numbers (d*) of advertisements; and (e) serving, by the server, to the particular search results page at least some of the plurality of advertisements according to at least one calculated value of d* in response to the search query for the keyword.

15. The method of claim 14, wherein the at least one business objective comprises maximized revenue or maximized user clicks, and wherein the plurality of advertisements comprise sponsored advertisements.

16. The method of claim 14, wherein a level of an advertisement within the hierarchal set of search results pages comprises a rank, and wherein multiple values of d* are calculated for each search results page of the set of hierarchal search results pages.

17. The method of claim 16, further comprising:
creating a histogram of the multiple d* for the keyword, including a frequency of a rank-depth corresponding to each d*.

18. The method of claim 16, the method further comprising:
computing class cardinality of the plurality of advertisers based on price bid elasticity of each advertiser for the keyword; and
if a value for d* reaches a rank-depth corresponding to a class K of advertiser, decrementing d* corresponding to the rank-depth by 1 until the advertiser class of the rank-depth corresponds to a class K−1;
wherein the advertiser classes comprise at least, in descending order, market maker, market neutral, and market follower.

19. The method of claim 16, wherein the probability of a click at the given depth comprises a depth elasticity of click rank distribution at that rank-depth on the particular search results page, and wherein the bid price estimate is based on a price bid elasticity at that rank-depth.

20. A method for maximizing page yield by optimizing display depth of advertisements displayed to searching Web users, the method executed by a server having a processor and memory, the method comprising:
(a) tracking click activity, by the server, on a plurality of sponsored advertisements by a plurality of users via a set of hierarchal search results pages delivered in response to a search query for a keyword by a search engine;
(b) tracking bidding activity, by the server, of a plurality of advertisers related to the keyword and corresponding advertisements of the plurality of advertisements;
(c) calculating, by the processor, an optimum number of advertisements (k*) to display on a particular search results page of the set of hierarchal search results pages in response to the search query such that a probability that a total share of click volume being greater than that of any of the plurality of advertisers is less than or equal to a predetermined business tuning parameter (β), wherein the probability values are obtained from a probability of click distribution based on the tracked click activity from at least one query;
(d) executing, by the processor, a Monte Carlo randomization procedure to include:
   (i) randomly sampling a different probability of click distribution than that of step (c) based on at least one different query;
   (ii) recalculating k* as per step (c); and
   (iii) repeating steps (i) and (ii) to calculate potential multiple optimum numbers (k*) of advertisements; and
(e) serving, by the server, to the particular search results page at least some of the plurality of advertisements according to at least one calculated value of k* in response to the search query for the keyword.

21. The method of claim 20, wherein each value of k* represents a display depth on the particular search results page, wherein calculating k* in step (c) further comprises:
(f) computing class cardinality of the plurality of advertisers based on price bid elasticity of each advertiser for the keyword, wherein the class cardinality includes classes comprising at least market maker, market follower, and market neutral;
(g) decrementing k* by 1 if the class of the advertiser at the display depth corresponding to k* is market neutral; and
(h) repeating step (g) until the advertiser at the given depth is determined to be a market maker or a market follower.

22. The method of claim 21, wherein a level of an advertisement within the hierarchal set of search results pages comprises a rank, and wherein multiple values of k* are calculated for each search result page of the set of hierarchal search results pages.

23. The method of claim 22, wherein the tuning parameter (β) reflects a percentage of clicks to be allocated to higher ranks of the hierarchal set of search results pages.

24. The method of claim 22, further comprising:
creating a histogram of the multiple k* for the keyword, including a frequency of a rank-depth corresponding to each k*.

25. A method for maximizing page yield by optimizing display depth of advertisements displayed to searching Web users, the method executed by a server having a processor and memory, the method comprising:
(a) tracking click activity, by the server, on a plurality of sponsored advertisements by a plurality of users via a set of hierarchal search results pages delivered in response to a search query for a keyword by a search engine;
(b) tracking bidding activity, by the server, of a plurality of advertisers related to the keyword and corresponding advertisements of the plurality of advertisements;
(c) calculating, by the processor, an optimum number of advertisements (k*) to display on a particular search results page of the set of hierarchal search results pages in response to the search query such that a probability that a total share of click volume being greater than that of any of the plurality of advertisers is less than or equal to a predetermined business tuning parameter (β), wherein k* represents a display depth on the particular search results page;
(d) computing, by a class cardinality module coupled with the processor, class cardinality of the plurality of advertisers based on price bid elasticity of each advertiser for the keyword, wherein the class cardinality includes classes comprising at least market maker, market follower, and market neutral;

(e) decrementing, by the processor, k* by 1 if the class of the advertiser at the display depth corresponding to k* is market neutral;

(f) repeating, by the processor, step (e) until the advertiser at the given depth is determined to be a market maker or a market follower; and (g) serving, by the server, to the particular search results page at least some of the plurality of advertisements according to at least one calculated value of k* in response to the search query for the keyword.

* * * * *